US008076632B2

(12) United States Patent
Kreysing et al.

(10) Patent No.: US 8,076,632 B2

(45) Date of Patent: Dec. 13, 2011

(54) DEVICE AND METHOD FOR THE CONTACTLESS MANIPULATION AND ALIGNMENT OF SAMPLE PARTICLES IN A MEASUREMENT VOLUME USING A NONHOMOGENEOUS ELECTRIC ALTERNATING FIELD

(75) Inventors: Moritz Kreysing, Hamm (DE); Jochen Guck, Leipzig (DE); Josef Kaes, Leipzig (DE)

(73) Assignee: Universitaet Leipzig, Leipzig (DE)

( * ) Notice: Subject to any disclaimer, the term of this patent is extended or adjusted under 35 U.S.C. 154(b) by 365 days.

(21) Appl. No.: 12/520,667

(22) PCT Filed: Dec. 21, 2007

(86) PCT No.: PCT/EP2007/011386

§ 371 (c)(1),
(2), (4) Date: Jul. 20, 2009

(87) PCT Pub. No.: WO2008/077630

PCT Pub. Date: Jul. 3, 2008

(65) Prior Publication Data

US 2010/0282984 A1 Nov. 11, 2010

(30) Foreign Application Priority Data

Dec. 22, 2006 (EP) .................................... 06026759

(51) Int. Cl.
*H01S 1/00* (2006.01)

(52) U.S. Cl. ........................................................ 250/251

(58) Field of Classification Search ................... 250/251
See application file for complete search history.

(56) References Cited

U.S. PATENT DOCUMENTS 5,363,190 A 11/1994 Inaba et al.

(Continued)

FOREIGN PATENT DOCUMENTS

DE 197 02 753 A1 7/1998

(Continued)

OTHER PUBLICATIONS

Arthur Ashkin, "Optical Trapping and Manipulation of Neutral Particles Using Lasers", Proc. Natl. Acad. Sci., USA, vol. 94, pp. 4853-4860, May 1997.

(Continued)

*Primary Examiner* — Michael Maskell

(74) *Attorney, Agent, or Firm* — John A. Merecki; Hoffman Warnick LLC

(57) ABSTRACT

The invention relates to a device for contactless manipulation and alignment of sample particles in a measurement volume using a nonhomogeneous electric alternating field, comprising a radiation source for emitting electromagnetic radiation and optical means for guiding the electromagnetic radiation into the measurement volume. The device is characterized in that the optical means include a beam shaping device for generating an intensity profile that is asymmetrical about the beam axis, wherein sample particles in the measurement volume can be trapped in a nonhomogeneous field distribution of the electric field generated by the asymmetrical intensity profile, that for the purpose of entraining sample particles trapped in the nonhomogeneous field distribution there is provided a rotating device to effect rotation of the asymmetrical intensity profile about the beam axis relatively to the measurement volume, and that the electromagnetic radiation beam in the measurement volume is unfocused, more particularly, divergent. The invention further relates to a method for contactless manipulation and alignment of sample particles in a measurement volume using a nonhomogeneous electric field.

23 Claims, 5 Drawing Sheets

U.S. PATENT DOCUMENTS

| | | | | |
|---|---|---|---|---|
| 6,067,859 | A * | 5/2000 | Kas et al. | 73/800 |
| 2004/0011650 | A1 | 1/2004 | Zenhausern et al. | |
| 2006/0196772 | A1 | 9/2006 | Kim et al. | |

FOREIGN PATENT DOCUMENTS

| | | | |
|---|---|---|---|
| DE | 100 59 152 | A1 | 6/2002 |
| DE | 103 20 869 | A1 | 12/2004 |
| DE | 10 2004 023 466 | A1 | 12/2005 |
| EP | 0 490 697 | A1 | 6/1992 |
| WO | WO 02/43870 | A1 | 6/2002 |
| WO | WO 2004/098777 | A2 | 11/2004 |

OTHER PUBLICATIONS

Reichle et al., "Electro-rotation in Octopole Micro Cages", J. Phys. D: Appl. Phys. 32, pp. 2128-2135, 1999.

Ashkin et al., "Observation of a Single-beam Gradient Force Optical Trap for Dielectric Particles", Optics Letters, vol. 11, No. 5, pp. 288-290, May 1986.

Friese et al., "Optical Alignment and Spinning of Laser-trapped Microscopic Particles", Nature 394, pp. 348-350, 1998.

Higurashi et al., "Optically Induced Angular Alignment of Trapped Birefringent Micro-Objects by Linearly Polarized Light", Physical Review E, vol. 59, No. 3, pp. 3676-3681, Mar. 1999.

Friese et al., "Optically Driven Micromachine Elements", Applied Physics Letters, vol. 78, No. 4, pp. 547-549, Jan. 22, 2001.

Higurashi et al., "Optically Induced Rotation of Dissymmetrically Shaped Fluorinated Polyimide Micro-Objects in Optical Traps", J. Appl. Phys., vol. 82, No. 6, pp. 2773-2779, Sep. 15, 1997.

Friese et al., "Optical Angular-Momentum Transfer to Trapped Absorbing Particles", Physical Review A, vol. 54, No. 2, pp. 1593-1596, Aug. 1996.

Leach et al., "Vortex Knots in Light", New Journal of Physics 7, pp. 1-11, 2005.

Bingelyte et al., "Optically Controlled Three-Dimensional Rotation of Microscopic Objects", Applied Physics Letters, vol. 82, No. 5, pp. 829-831, Feb. 3, 2003.

Ishaaya et al., "Very High-Order Pure Laguerre-Gaussian Mode Selection in a Passive Q-Switched Nd: YAG Laser", Optics Express, vol. 13, No. 13, pp. 4952-4962, Jun. 27, 2005.

Santamato et al., "Optical Angular Momentum Transfer to Transparent Isotropic Particles Using Laser Beam Carrying Zero Average Angular Momentum", Optics Express, vol. 10, No. 17, pp. 871-878, Aug. 26, 2002.

Taguchi et al., "Optical Trapping of Dielectric Particle and Biological Cell Using Optical Fibre", Electronics Letters, vol. 33, No. 5, pp. 413-414, Feb. 27, 1997.

Taguchi et al., "Rotational Manipulation of a Yeast Cell Using Optical Fibres", Electronic Letters, vol. 33, No. 14, pp. 1249-1250, Jul. 3, 1997.

Taguchi et al., "Three Dimensional Optical Trapping Using Plural Optical Fibers", Proceedings of CLEO 2000, p. CtuK19, 2000.

Taylor et al., "Particle Trapping in 3-D Using a Single Fiber Probe with an Annular Light Distribution", Optics Express, vol. 11, No. 21, pp. 2775-2782, Oct. 20, 2003.

A. Ashkin, "Acceleration and Trapping of Particles by Radiation Pressure", Physical Review Letters, vol. 24, No. 4, pp. 156-159, Jan. 26, 1970.

Collins et al., "MicroInstrument Gradient-Force Optical Trap", Applied Optics, vol. 38, Issue 28, pp. 6068-6074, Oct. 1, 1999.

Guck et al., "Optical Deformability of Soft Biological Dielectrics", Physical Review Letters, vol. 84, No. 23, pp. 5451-5454, Jun. 5, 2000.

Guck et al., "The Optical Stretcher: A Novel Laser Tool to Micromanipulate Cells", Biophysical Journal, vol. 81, pp. 767-784, Aug. 2001.

Singer et al., "Self-Organized Array of Regularly Spaced Microbeds in a Fiber-Optical Trap", Journal of Optical Society of America, B: Optical Physics, vol. 20, Issue 7, pp. 1568-1574, Jul. 1, 2003.

Pawley, "Handbook of Biological Confocal Microscopy", Second Edition, 1995.

* cited by examiner

DEVICE AND METHOD FOR THE CONTACTLESS MANIPULATION AND ALIGNMENT OF SAMPLE PARTICLES IN A MEASUREMENT VOLUME USING A NONHOMOGENEOUS ELECTRIC ALTERNATING FIELD

FIELD OF THE INVENTION

The present invention relates, in a first aspect, to a device for the contactless manipulation and alignment of sample particles in a measurement volume using a nonhomogeneous electric alternating field.

In a second aspect, the invention relates to a method for the contactless manipulation and alignment of sample particles in a measurement volume using a nonhomogeneous electric alternating field.

RELATED ART

In further aspects, the invention relates to a laser scanning microscope and a method for operating a laser scanning microscope.

A generic device and a generic method are described in: Arthur Ashkin, Optical trapping and manipulation of neutral particles using lasers, 1997; Volume 94; pages 4853-4860 PNAS. The laser scanning microscopy and applications thereof in Biology are described in: James B. Pawley, "Handbook of Biological Confocal Microscopy", 1995, Plenum Press, New York. Furthermore, a confocal laser scanning microscope is disclosed in DE 197 02 753 A1.

The following set-ups and methods for alignment and rotation of particles are known.

i) Dielectrophoresis is a possibility for positioning and aligning dielectric particles, in this case particles with a diameter less than 1000 μm and a dielectric constant differing from that of the surrounding medium which is also referred to as circumambient medium, the dielectrophoresis using the forces that inhomogeneous electric fields act upon electric polarisable matter. Depending on whether the particles to be manipulated follow the field gradient or move into the opposite direction, the electrophoresis is called positive or negative, respectively.

More accurately, in this method electrodes from which the electric fields emerge are needed in the vicinity of the particles to be manipulated. An especially practicable set-up of these electrodes is realized in so-called field cages in which at least four electrodes enclose a volume which is dimensioned according to the size of the particles to be manipulated. For generating the electric field distributions around the electrodes, the electrodes are supplied with an alternating voltage of definite amplitude, frequency and phase. Direct voltages proved to be disadvantageous as they can lead to undesired side effects like electrolysis of the medium, high heating or a flow in the medium. However, also by using alternating voltages these side effects cannot be excluded completely.

Furthermore, the dielectric properties of the samples are in general a function of the frequency of the electric fields which surround them. In this way, many materials experience e.g. embedded in common media as for example aqueous electrolyte solvents, a positive dielectrophoresis below a certain frequency and a negative dielectrophoresis above this frequency. For particles not completely characterised it can be therefore required to adjust the frequency via a trial and error method in order to configure the operation of a field cage efficiently.

By adequate geometries of the field cage and suitable voltages at the electrodes it is possible to create local extrema of the electric field strength, which can be used for trapping dielectric particles, i.e. to hold them stable in relation to their spatial position. Furthermore it is possible to convey continuous torque to trapped particles through a rotating electric field created by the phase positions of the voltages at the single electrodes, the phase positions being adapted to the geometry of the cage. Depending on the cage there can be different orientations so that it is possible to rotate a trapped dielectric particle about more than one axis solely by adapting the phase. It is possible to achieve a number of revolutions exceeding 100 rotations per second depending on the properties of the concrete total system. It is characteristic for this rotation that on the one hand there is an equilibrium between the torque induced by the electric field and the torque caused by hydrodynamic friction, and that on the other hand in general the particle is not in an equilibrium in regard to its orientation. Particularly, the frequency of rotation of the trapped particle is not the frequency of the field but is many magnitudes below the latter.

The adaptation of the rotational speed of the particles to a desired value is carried out according to the principle "trial and error", in the general case of lack of knowledge of the complete structure of the given particles with regard to feedback mechanism. Thus, it is possible to observe via a microscope e.g. the rotation of biological cells in a suspension and, if needed, to accelerate or slow down the rotation by adequate adaptation of the electric alternating fields. As a result of this, the rotation through small angles of particles not completely characterized, such as biological cells, is in the best case only possible by accompanying measurements. Literature: Christoph Reichle, Torsten Müller, Thomas Schnelle and Günter Fuhr: "Electrorotation in octopole micro cages", J. Phys. D: Appl. Phys. 32 (1999) 2128-2135; DE 100 59 152 C2, DE 10 2004 023 466 A1 and DE 103 20 869 A1.

ii) Another possibility to rotate microscopic particles is given by so-called optical tweezers. Optical tweezers are understood to be an optical trap which can hold and position a particle that has an index of refraction differing from that of the surrounding medium, by means of a focused laser beam. The principle set-up is as follows: by using a half-silvered mirror a parallel laser beam widened to a diameter of several millimetres is coupled into the optical path of a light-optical microscope and is focused by an oil-immersion-objective with a high numerical aperture into the sample chamber, which is typically a liquid layer between two cover glasses, the laser beam typically being monochromatic with a wavelength in the visible spectrum or in the near infrared and having a Gaussian intensity profile, typical power: 50 mW. As the field energy of an electromagnetic wave is reduced when entering a medium with a higher index of refraction, particles experience a force in the direction of the centre of the field energy (gradient force), which particles have a higher optical density with regard to the surrounding medium and reach the area of the finitely widened focus by either arbitrary molecular motion or in a well-directed manner. Furthermore, as a consequence of the light scattering at the particles, a so-called scattering force acts on the particles and stabilizes them in axial direction. The scattering force alone pushes the sample particle away from the laser. A stabilising effect is achieved together with the gradient forces.

Thus, in regard to the laser beam there is an equilibrium of the position of the particle in the focus, the equilibrium being characterized in that the scattering and gradient forces acting on the trapped particle just compensate each other and particles are driven back to the position of equilibrium in the case of small displacements from the position of equilibrium.

This can for example be used for fixing microparticles or for moving them by changing the incident angle of the laser beam into the objective. In the case of manipulation of biological cells it is necessary to attach microparticles to the cells via adequate methods, the microparticles being of a size similar to that of the cells, e.g. small latex microspheres, in order to act on these with the optical tweezers, since due to the focusing of the laser beam used, the laser intensity is too high for the biological cells as to allow for their integrity in the utilisable area used for holding the microparticles. Literature: A. Ashkin, J. M. Dziedzic, J. E. Bjorkholm, and Steven Chu: "Observation of a single-beam gradient force optical trap for dielectric particles", OPTICS LETTERS/Vol. 11, No. 5/May 1986; DE 691 13 008 T2.

With this set-up there are several possibilities to rotate particles.

a) In birefringent samples the polarisation state of the laser light changes in such a way that a torque acts on the samples. This torque transmission leads to a continuous rotation about the laser axis and can be regulated by changing the intensity and polarisation of the incident laser beam. An application of this principle are light-driven cogwheels with a diameter smaller than 20 μm which are used in so-called micromachines. Literature: M. E. J. Friese, T. A. Nieminen, N. R. Heckenberg & H. Rubinsztein-Dunlop: "Optical alignment and spinning of laser-trapped microscopic particles", Nature 394, 348-350 (1998), E. Higurashi, R. Sawada, and T. Ito: "Optically induced angular alignment of trapped birefringent micro-objects by linearly polarized light", NTT Opto-electronics Laboratories, 3-9-11, M. E. J. Friese and H. Rubinsztein-Dunlop: "Optically driven micromachine elements", Applied Physics Letters—Jan. 22, 2001—Volume 78, Issue 4, pp. 547-549.
b) Samples with a geometry and distribution of refractive index leading to a scattering of the laser beam used in optical tweezers in such an asymmetric way that due to the conservation of momentum valid for photons a torque is transmitted to the sample, are rotated by this. This effect is known as windmill effect and usually occurs at specifically produced microparticles that have a shape reminding of propellers. In the broadest sense this is also a kind of birefringence of the particle, since the spin as well as the orbital angular momentum of the laser beam used can be changed. Also, the rotation is carried out continuously. Literature: E. Higurashi, O. Ohguchi, T. Tamamura, H. Ukita, R. Sawada: "Optically induced rotation of dissymmetrically shaped fluorinated polyimide micro-objects in optical traps", J. Appl. Phys., Vol. 82, No. 6, 15 Sep. 1997.
c) Optical spanners: Here, the set-up of the optical tweezers described above is modified in such a way that the laser beam coupled into the microscope optics is previously polarised such that the average total angular momentum of the photons is clearly different from zero. This is accomplished by spatial light modulators that provide the light with an orbital angular momentum via modulating the phase position over the wave front. By scattering and absorption of this laser light at the trapped particles a continuous transmission of angular momentum to said particles takes place, resulting in a rotation of the trapped particles about the laser axis. It is also possible to send micro particles on circular orbits which they pass periodically without the necessity of a guidance of the single particles by e.g. displacement of the incident laser beam. Literature: M. E. J. Friese, J. Enger, H. Rubinsztein-Dunlop, and N. R. Heckenberg: "Optical angular momentum transfer to trapped absorbing particles", Physical Review A 54, 1593-1596, (1996), J Leach, M. R. Dennis, J. Courtial and M. J. Padgett: "Vortex knots in light", New J. Phys. 7 (2005) 55.
d) Additionally, there are suggestions to hold objects with several optical tweezers simultaneously and to rotate asymmetrical particles about the optical axis of the microscope by a variation of the relative position of the foci to the each other.

For this purpose it is possible to either couple in several laser beams into the microscope via beam splitter-optics or deflecting the laser beam via automatically controlled mirrors or acousto-optical deflectors (AOD), which jump between at least two positions back and forth, in such a way that the thus generated partial beams converge in more than one focal point. Another possibility to create more than one focus is the use of holographic phase plates. Such a set-up is also called holographic optical tweezers.

Rotations perpendicular to the optical axis of the microscope have been realised with dumbbell-shaped microparticles produced especially for this purpose, which particles consist of two partially fused glass microbeads with a diameter each of circa 5 μm, in a trial and error experiment. It has also been shown in laboratory experiments that it is possible to modify solid state lasers by inserting an appropriate aperture diaphragm into the resonator cavity in such a way that the laser beams emitted by these lasers are focused by an objective on more than one point. Each of these foci can thus be used as optical tweezers. Literature: V. Bingelyte, J. Leach, J. Courtial, and M. J. Padgett: "Optically controlled three-dimensional rotation of microscopic objects", APPLIED PHYSICS LETTERS VOLUME 82, NUMBER 5, 3 Feb. 2003; Amiel Ishaaya, Nir Davidson, and Asher Friesem: "Very high-order pure Laguerre-Gaussian mode selection in a passive Q-switched Nd:YAG laser", Optics Express # Vol. 13, Iss. 13—June 2005 pp: 4952-4962; Enrico Santamato, Antonio Sasso, Bruno Piccirillo, and Angela Vella: "Optical angular momentum transfer to transparent isotropic particles using laser beam carrying zero average angular momentum", Optics Express Vol. 10, Iss. 17—August 2002 pp: 871-878.

iii) Focusing optical fibers, i.e. commercially available light carrying optical fibers that have an end that is provided with a small collective lens or is differently modified in an adequate way, can be used for holding microscopic particles in a stable way. This principle is comparable to that of the optical tweezers with the difference that the laser beam does not need to be coupled in into the microscope optics but is carried by the optical fiber into the sample chamber. Due to the elongated form of the focus generated by the prepared fiber end, microscopic particles orientate themselves with their longest axis parallel to the direction of propagation of the laser beam. By superposition of the foci of several optical fibers it is possible to re-orientate trapped particles by appropriate turning on and off of the fiber lasers. The particles align themselves within a short amount of time parallel to the optical axis of a respective active optical fiber. If permitted by the geometry of the devices used in the further set-up and by the flexibility and dimensions of the optical fibers, this method allows for rotating the particles in steps from one equilibrium position to the next. Here, the number of stable orientations is at most double the number of the fibers. Literature: K. Taguchi, H. Ueno, T. Hiramatsu and M. Ikeda: "Optical trapping of dielectric particle and biological cell using optical fibre", ELECTRONICS LETTERS 27th February 1997 Vol. 33; K. Taguchi, H. Ueno and M. Ikeda: "Rotational manipulation of a yeast cell using optical fibres", ELEC- TRONICS LETTERS 3 Jul. 1997 Vol. 33 No. 14; K. Taguchi, M. Tanaka, K. Atsuta and M. Ikeda: "Three Dimensional Optical Trapping Using Plural Optical Fibers", Proc. of CLEO2000, pp.CtuK19, (2000-9); Taylor, R. S.; Hnatovsky, C.: "Particle trapping in 3-D using a single fibre probe with an annular light", Optics Express, vol. 11, Issue 21, p. 2775.

iv) Two-beam laser traps and methods based upon these for manipulating microparticles: This kind of laser trap has been realised for the first time in 1970 by A. Ashkin with freely propagating laser beams. The technically slightly altered form of today uses the guidance of laser beams by optical fibers into the sample chamber. However, the principle of both configurations is the same. Two divergent laser beams with Gaussian intensity profiles are aligned against each other such that their optical axes coincide. Similar to the optical tweezers also in this case two kinds of forces act on the particles that have a higher optical density with regard to their surrounding medium and reach the area of the laser beams: Gradient forces that pull the particle into the area of maximal laser intensity, i.e. which radially centre the particle, and scattering forces in the direction of propagation of the laser beams, which provide an alignment along the optical axis. This results in the particle being in a stable equilibrium position centred between the two laser beams after a relatively short amount of time, if the constitution of both laser beams is the same. Increasing the intensity of one of the laser beams leads to a slight displacement of this equilibrium position of the trapped particle along the optical axis in the direction of propagation of this laser beam. For an efficient design of this trap the diameter of the laser beams in the area of the equilibrium position of the trapped particles should not substantially exceed the size of the particles. The full angle of divergence of the laser beams is typically between 10 and 20 degrees in the far field. The laser power needed for trapping and holding depends on the difference in density between the particle and its surrounding medium, the size of the particle, the relative refractive indexes, the temperature, and the geometry of the trap, as well as if applicable, the divergence and width of the laser beams. In regard to trapping and holding biological cells in aqueous media the laser power is, however, between 5 and 300 mW continuous power per laser beam; typically: full angle of divergence in the far field in air 15 degrees, wavelength in the near infrared, e.g. 1060 nm.

The defined rotation of particles is not possible with this set-up. However, by a slight tilt of the laser beams against each other a trapped particle can be forced onto a periodical orbit within the trap. The dynamics of this process are characterized by the alternating acting of the scattering forces and gradient forces of both laser beams on the particle. This can be qualitatively described as follows: The particle is in the centre of laser beam 1, the scattering force acting upon it pushes it in the direction of laser beam 2 until the gradient force caused by the latter dominates, re-centres the particle, and the scattering force caused by laser beam 2 pushes it again in the direction of laser beam 1 and so forth. This effect usually occurs involuntarily if the laser beams are not optimally aligned, but is never used.

Furthermore, optical traps comparable to the principle of the two-beam laser traps have been constructed by using more than two laser beams, in which trapped particles are forced by not optimally aligned fiber ends on similar periodical orbits.

Additionally, elliptical particles can be turned from one laser beam to another by variation of their relative laser intensities, since those particles always align themselves in optical traps with their principal axis parallel to the direction of propagation of the laser beam. The number of possible orientations is in this case, as in the case of the optical trap based on focusing optical fibers, is maximal the double amount of optical fibers used.

Fiber-based laser traps are also used in the field of measurements of viscoelasticity of biological cells, which was firstly realised by J. Guck et al. with a fiber-based divergent two-beam laser trap. In this it is exploited that in sufficiently high laser intensities forces act on the membrane of a cell which are capable of deforming it, as a consequence of the relativistic energy-momentum relation as well as the general principle of conservation of momentum. A trap used for this purpose is also called an optical stretcher.

Two-beam laser traps can also be used for putting spherical microparticles with a size of up to few micrometers equidistantly in a row. Literature: A. Ashkin: "Acceleration and Trapping of Particles by Radiation Pressure", Phys. Rev. Lett. 24, 156-159 (1970); S. D. Collins, R. J. Baskin, and D. G. Howitt, "Microinstrument gradient force optical trap", Applied Optics 38, 6068-6074 (1999); Guck, J., R. Ananthakrishnan, T. J. Moon, C. C. Cunningham and J. Käs: "Optical deformability of soft dielectric materials", Phys. Rev. Lett., 84 (23), 5451-5454 (2000); Guck, J., R. Ananthakrishnan, T. J. Moon, C. C. Cunningham and J. Käs: "The Optical Stretcher—A Novel, noninvasive tool to manipulate biological materials", Biophys. J., 81, 767-784 (2001); W. Singer, M. Frick, S. Bernet, and M. Ritsch-Marte: "Self-organized array of regularly spaced microbeads in a fiber-optical trap", J. Opt. Soc. Am. B 20, 1568 (2003).

All solutions described above have at least one of the following disadvantages in regard to the field of application of the invention:

The rotation of the particle is a result of a continuous transmission of angular momentum. This leads to the circumstance that trapped particles that are not completely characterized can only be rotated through a definite angle in a feedback mechanism by using a trial and error method. In the case of dielectric field cages and optical spanners this means concretely: The rotation of microscopic particles about a definite angle is only possible by interrupting a continuously induced rotation shortly before passing the desired orientation and by slowing down the particle under consideration of the ratio between occurring inertial and frictional forces. For judging whether the desired orientation is already reached, a measurement is generally required which is typically carried out with a light microscope.

It is not possible to carry out the rotation of microscopic particles in the limiting case of small angular velocities in an equilibrium. This means that the orientation of a particle after completion of a rotation is in general not stable. Therefore, it is not possible with the methods described in i), ii)a), ii(b), iic), iii) and iv) to hold a particle stably in an arbitrary orientation in regard to at least one of the possible axes of rotation. If a certain orientation is to be kept, it is necessary to counteract the torques, which act upon asymmetrical particles due to the asymmetry of the set-up, dynamically, necessarily by using feedback mechanisms. In the case of field cages the rotational symmetry of the system is broken by the limited number of electrodes used. In the case of optical spanners it is the polarisation direction of the laser beam which is used to hold the particle that provides a preferred orientation of asymmetrical particles.

As a consequence of the last point, rotations can only be achieved by feedback mechanisms with a constant angular velocity. Judging whether an e.g. biological cell rotates with a constant angular velocity is particularly problematic if the structure of the cell is still substantially unknown and is to be determined by the rotation.

The use of optical tweezers for rotating microscopic particles is a strong confinement in the microscope optics that can be used, which in general are simultaneously used for observing the particles. Here, it is necessary to use objectives with a high numerical aperture. This results in a very small operation distance as well as in a very high magnification which is not always desired. Furthermore, optical tweezers cannot be regarded as universally applicable additional modules for arbitrary microscopes. The integration of optical tweezers into a microscope is generally very complex and in many types of microscopes it is not at all or only restrictedly possible. For instance confocal microscopes, deconvolution microscopes and all microscopes that use an objective with a numerical aperture smaller than circa 1.1 are problematic for the combination with optical tweezers.

Due to the extremely high peek intensities caused by the focusing of the laser beams used, optical tweezers are in most cases not suited for direct manipulation of biological samples. Thermal damages as well as radiation damages on the samples can be minimised by choosing an appropriate wavelength but can never be completely avoided.

In most cases the birefringence of microscopic particles is way too small as that said particles may experience torque, which sets them in rotation, in a linearly polarised laser trap. Here, exceptions are specifically produced micro cogwheels and optically active crystals.

The rotation of microscopic particles with optical tweezers is usually carried out about the optical axis of the microscope optics used for guiding the laser beam, which are usually also used for observing the particle. This means the rotation of the particle under observation leads to no additional information gain. This method is thus entirely inadequate as a basis for tomographic examinations. While it is theoretically feasible to observe the particle with a second microscope from the side, it is simple not practicable due to the geometry of commercially available microscopes which geometry is subordinated to the functionality. As e.g. the distance of the laser emitting objective to the particle must not be substantially larger than 250 μm but the objectives suitable for optical tweezers typically have a diameter of not less than 2 cm, the objective used for observation would need to have a working distance of at least 1 cm. However, this constellation would decrease considerably the achievable resolving capacity, since the resolving capacity is substantially a function of the maximum angle at which light emitted by the sample reaches the objective.

Dielectric field cages usually work according to the principle of negative dielectrophoresis, that means particles to be trapped have to reside in a medium with a higher dielectric coefficient. Since in this case the required field strengths are large, typically >20 kV/m, usually small electric currents flow between the electrodes in the sample chamber, which may have undesired consequences on the trapped particles. These can comprise heating as well as structural changes and even death of sensitive samples such as biological samples.

For manipulating biological samples it is therefore necessary to use special, weakly conducting media, which are, however, not compatible with many cell types, or their consequences on the integrity of said cells are unknown.

Devices in which particles are hold via the dielectrophoresis are described in US-2004/0011650 A1, US-2006/0196772 A1 and WO 02/43870 A1. A device for treating suspended particles with a liquid, in which, additionally, these particles are held via optical holding forces, is disclosed in WO 2004/09877 A2.

U.S. Pat. No. 5,363,190 discloses a method and a device in which, according to the principle of optical tweezers described above, a particle is held in the focus of an asymmetrical beam distribution and is manipulated there by rotating the beam profile.

SUMMARY OF THE INVENTION

It is an object of the invention to provide a device and a method which facilitate the manipulation and alignment of sample particles in a measurement volume.

Preferred embodiments of the device of the invention and preferred variants of the method of the invention form the subject matter of the dependent claims.

According to the invention, the device of the type mentioned above is developed in that the optical means include a beam shaping device for the production of an intensity profile asymmetrical about a beam axis, wherein sample particles in the measurement volume can be trapped in a nonhomogeneous field distribution of the electric field produced by the asymmetrical intensity profile, that a rotating device for rotating the asymmetrical intensity profile about the beam axis relatively to the measurement volume is present for entraining sample particles trapped in the nonhomogeneous field distribution, and that the electromagnetic radiation is unfocused, more particularly, divergent in the measurement volume.

According to the invention, the method of the type mentioned above is developed in that an intensity profile asymmetrical about a beam axis is imposed on the electromagnetic radiation that is introduced into the measurement volume, which intensity profile produces, in the measurement volume, a nonhomogeneous field distribution of the electric field, in which sample particles are trapped, that for entrainment of the sample particles trapped in the nonhomogeneous field distribution the asymmetrical intensity profile is rotated about the beam axis relatively to the measurement volume, and that the electromagnetic radiation beam in the measurement volume is unfocused, more particularly, divergent.

The invention also relates to a laser scanning microscope or, more particularly, to a confocal laser scanning microscope, which comprises a device of the invention for the contactless manipulation and alignment of sample particles in a measurement volume using a nonhomogeneous electric alternating field.

Finally, the invention also relates to a method for operating a laser scanning micro-scope, more particularly, a confocal laser scanning microscope.

The expression "electric alternating fields" is used for the purposes of the present invention to mean the electromagnetic radiation fields emitted using the radiation source present according to the invention, which radiation source can be, in particular, a laser. The electric alternating fields in this sense are not fields emanating from free charges, as is the case with electric field cages, for example.

A first central concept of the invention may be regarded to be the fact that a nonhomogeneous field distribution of the electric field, by means of which an azimuthal alignment of a sample particle relative to a beam axis can be produced using a rotationally asymmetrical beam profile in a measurement volume.

A further central concept of the invention is to be seen in that particles or sample particles trapped or held in this manner can be manipulated, aligned, and rotated in the measurement volume by simply rotating the rotationally asymmetrical intensity profile relatively to the measurement volume. Rotation of the field distribution about a well-defined axis of rotation is accomplished by varying the electromagnetic radiation.

The effect of the invention results from the behavior of specifically polarizable matter in the field of electromagnetic radiation that is emitted anisotropically, for example, rotationally asymmetrically. Laser sources are mainly used as the source of radiation.

In clear contrast to U.S. Pat. No. 5,363,190, the present invention does not necessitate focusing of the laser light to enable sufficient laser intensities to be achieved. The use of unfocused, more particularly divergent, laser light is advantageous as regards the axial stabilization of a sample, as described below in detail, for example in a divergent double trap, as regards its position and orientation normal to the laser axis. In this respect, the invention differs fundamentally from the principle of optical tweezers implementing focused light.

Where adaptive optical systems are used in the present invention, they are in no way intended to focus the laser beams, but rather to generate astigmatism of the emitted beam profile.

In the present invention, the laser light in the measurement volume is not focused, more particularly not focused actively. Accordingly, this obviates the need for focusing means, in clear contrast to U.S. Pat. No. 5,363,190.

The invention makes it possible to achieve, in particular, precise rotation of, say, cells for tomographic purposes. For example, an isotropically highly resolved three-dimensional overall image of a sample particle, for example, a dyed cytoskeleton of a suspended cell, can be obtained by confocal microscopy.

In principle, the disadvantage of the method described in U.S. Pat. No. 5,363,190 consists in that the possibility of holding a sample particle using focused laser beams, especially in a stable manner, is greatly limited by the size, refractive index, and absorptive properties of the sample particle. Thus, primarily in samples of a size larger than that of cell organelles, the inelastic light scattering and the associated increase in the scattering forces at the expense of the gradient forces rapidly render the system unstable. Compensation of this effect by the selection of other wavelengths is only possible to a very limited extent.

In the present invention, which implements, in particular, divergent counterpropagating laser beams, particles of any kind can be trapped. The size of the particles concerned ranges from the nanometer range to the maximum beam width, which can be equal, for example, to the length of one radius of the optical fibers used. The only requirement is that the refractive index of the sample particle must be higher than that of the surrounding medium, which is usually aqueous, and basically all cells and organelles meet this requirement. Likewise, a shift of the ratio of scattering forces to gradient forces does not imply any loss in stability.

A further basic difference between the present invention and U.S. Pat. No. 5,363,190 is that in the case of the focused elliptical laser beams used in U.S. Pat. No. 5,363,190, the cells are oriented with their principle axis of anisotropy normal to the laser axis, whereas in the present invention they can be aligned along the laser axis. Only a second axis of anisotropy present will be aligned in accordance with the elliptical intensity profile of the laser beam. The advantage gained is that the axis of rotation is more stable in space and, in addition, will not tilt in the event of fast rotation, that is to say, in the case of non-equilibrium rotation. In the presently described invention, the electromagnetic radiation is coupled not only to the principal axis of anisotropy, but also to the dielectric tensor to be assigned to a sample, unlike solutions based on focused laser beams. This not only damps fluctuations of the particle in the trap, but also makes it possible to achieve extremely well defined and reliable rotation, including stepwise rotation, of trapped sample particles for, say, tomographic purposes.

Moreover, the present invention avoids the problem occurring with the use of focused laser beams to the effect that the comparatively much higher energy flow through the sample particles having the size of cells results in markedly more severe damage to the sample at comparable holding forces.

The use of focused laser beams also has the drawback that it is not possible to simultaneously deform trapped sample particles by means of the optical forces without damaging them severely.

Furthermore, the present invention advantageously has no need for rigid optomechanical coupling between the system and the laser source. The generally highly sensitive adjustment of the optical elements for deflecting and focusing the laser beams in the sample chamber is not required.

Furthermore, the present invention does not require any complex sample chamber geometry, as might possibly limit the freedom of choice with respect to the objectives used for the inspection of the samples. In particular, unlike the solution described in U.S. Pat. No. 5,363,190, even objectives having a high numerical aperture can be combined with an optical fiber-based cell rotator technology.

An implementation of the present invention does not require the use of additional objectives, the integration of which in a universal attachment for existing microscopes might be problematic. Furthermore, the preferred embodiment in which optical fibers are used, as opposed to the immersion objectives proposed in U.S. Pat. No. 5,363,190, is more cost-effective and is not subject to transmission losses.

The presently described invention, which is also referred to as a cell rotator, can be extremely flexibly adapted to meet the requirements of a wide variety of experiments. For example, the cell rotator can be implemented on a simple cover glass.

The possibility of rotating the beam profile in the fiber makes a “lab on a chip” implementation of the cell rotator seem realistic, in contrast to U.S. Pat. No. 5,363,190. The piezo mechanics required for such beam steering operate extremely reliably and can be accommodated within a minimum amount of space.

In particular, the cell rotator can be designed for the use of a microfluidic cell delivery.

For the preferred exemplary embodiment in which the electromagnetic radiation is guided into the measurement volume by optical fibers, it is relatively improbable, due to the proximity of the optical fiber ends to the sample, a typical distance being 100 μm, and due to the relatively small beam diameter in this region, that sample particles driven by Brownian motion or other means will be accidentally trapped and will influence the beam profile by scattering and/or absorption, which might have a destabilizing effect on the position and orientation of the particles to be manipulated.

Furthermore, a distinct advantage of the present invention over U.S. Pat. No. 5,363,190 can be seen in the fact that ellipsoid sample particles can be aligned relatively to two axes. As a result, undesirable rotations of the trapped sample are suppressed and image acquisition by means provided for this purpose is facilitated or only now made possible.

Thus, an essential feature of the present invention consists in that the electromagnetic beam used, more particularly the laser beam, in the measurement volume is unfocused, more particularly, divergent.

In principle, beams having intensity profiles that are Bessel-modulated in the radial direction can also be used. Such beams propagate in a substantially parallel fashion.

According to the invention, for example, solitary microscopic particles having a diameter ranging from 0.2 to 5000 μm, which are already in a state of stable equilibrium with respect to their position or can be equilibrated by the device of the invention, can be rotated contactlessly through defined angles. The rotation can be carried out in such a way, in particular, that it is possible to hold a particle steady in any desired orientation relative to an axis of rotation.

The device of the invention is intrinsically a unit which is in terms of its functionality independent of instruments that are possibly necessary for observing the manipulated, aligned, and/or rotated particles, and, more particularly, is independent of a microscope used for this purpose. Nevertheless, the device of the invention provides numerous particularly advantageous and novel applications in the field of microscopy. For example, contactless rotation of the particles can be carried out transversely to an optical axis, or more particularly normal to an optical axis, of an instrument used for observation purposes. The possible novel applications extend beyond the solutions described above and make it possible to avoid the limitations present in those solutions to a large extent. The system of the invention may also be described as an electromagnetic radiation trap that enables microscopic particles, the optical properties, in particular the refractive index and absorptive properties, of which differ from those of a surrounding medium, to be held in any desired orientation relatively to at least one axis of rotation. In principle, asymmetrical intensity profiles of a number of radiation sources, which intensity profiles are superimposed in the measurement volume, are also feasible and might be advantageous for certain applications. The refractive index of the particle to be manipulated must be greater than that of the surrounding medium.

The invention relates, in particular, to the stable contactless alignment and rotation of particles having a typical diameter of from 0.2 to 5000 micrometers. This is of significance mainly for microscopy technologies used for achieving high isotropic resolutions such as those involved in computer assisted tomography performed on individual biological cells, suspended cell organelles or small cell structures using a light microscope.

Another application is the use of the device of the invention in microfluidic systems in order to determine, for example, the viscosity of minute amounts of substances such as those used in microreactors, or to quantify minute torques.

The device of the invention, which can also be referred to as a cell rotator, can also be used advantageously together with an optical stretcher. When use is made of this combination, it is possible to prevent the microfluidic flow from inducing cell rotation while the cell undergoes deformation or stretching.

In the device of the invention, at least one electromagnetic beam is used, which is guided into the sample chamber by means of suitable optical elements such as optical wave guides, mirrors, or microprisms in such a way that its transverse dimension is approximately equal to the particle size or is generated in immediate proximity of the sample chamber having appropriate geometry, for example by a laser diode. The sample particles are thus aligned relatively to at least one axis. An alignment relative to more than one axis is also possible, in principle. A plurality of radiation sources can be used for this purpose. A special feature of the guidance of the electromagnetic radiation used is that, unlike the use of optical tweezers, the electromagnetic radiation can be considered as being completely decoupled from microscope optical elements possibly used for observation of the sample.

The initial purpose of the electromagnetic beams used is, as in laser traps, to bring the particles to be manipulated into a state of stable equilibrium with regard to their position and to compensate any other forces which may be acting on the particle. If only one beam is used for this purpose, it is necessary that the same be convergent or alternatively that a force directed contrary to the propagation direction of this beam such as gravitation or frictional forces caused by the flow of the medium, act on the particle in order to compensate any scattering forces that occur.

Should a plurality of beams be used, these can be directed contrarily to each other such that scattering forces resulting therefrom and acting on the trapped particle cancel each other out. In general, the point at which the position of the particle in the trap is stabilized is characterized by the disappearance of the sum of all acting forces and the occurrence of restoring forces in the case of small deviations from the state of equilibrium. Furthermore, the use of at least one electromagnetic beam having a rotationally asymmetrical profile provides a potential for the orientation of trapped particles that are not entirely homogeneous in terms of their optical properties or are shaped asymmetrically, as regards rotation thereof about the propagation direction of said beam. The asymmetry of this beam can refer to the intensity profile, its polarization and the modulation of the phase over the beam cross-section. The smallest deviations of the particle shape from solids of revolution, which are virtually always present in real samples, are sufficient for forming a potential for angular orientation. The result of this potential is a preferential orientation of the particle in the trap, which preferential orientation is captured in the trapping process and then held steady. If the profile of the asymmetrical beam and thus the potential for the angular orientation of a trapped particle is rotated, the particle rotates concurrently. In the limiting case of low angular velocities, this rotation occurs in a state of equilibrium, i.e. at the minimum of the potential. The rotation of the asymmetrical beam profile responsible for the orientation of the particle is most simply realized by rotating a waveguide emitting the beam asymmetrically. Other options for rotation of the beam profile include, for example, the use of astigmatic lenses or mirrors.

The method of the invention comprises the following steps, some of which may be considered as optional depending on the nature of the sample.

First of all, the particles to be examined can be prepared for carrying out the method of the invention, as follows.

The particles to be examined are isolated and particle aggregates are broken down. Depending on the sensitivity and nature of the sample, different methods are suitable for this purpose, ranging from rough mechanical action on the sample, as achieved for example by comminution in a mortar, through ultrasonic methods to methods in which the sample is suspended in liquid media with the addition of suitable chemicals. In the case of biological cells, an enzymatic treatment of the sample may likewise be necessary to break down intercellular structures.

If necessary, the sample can be freed from impurities by conventional techniques such as sedimentation, centrifugation, or chemical purification.

Once the particles have been prepared, they can be treated as follows:

The isolated particles are introduced in their medium into the sphere of influence, which is also referred to as zone of action, of the radiation trap of the present invention. In the case of liquid media, it is possible to use microfluidic transportation systems, micropipettes, or optical tweezers for this purpose. When in gases or in vacuo, the particles can be transported using, for example, microprobes, electric fields, optical tweezers, or atomizers, the latter being suitable only to a limited extent in vacuo. When choosing the medium, care must be taken to ensure that the medium does not react chemically with the particles. Likewise, the medium should be a good conductor of heat in the case of particles that absorb the radiation used.

If a plurality of solitary particles are present in the trap—a situation which is unfavorable for the further steps of the method—, the power of the laser beams used can be decreased until all but one of the particles have been driven out of the sphere of influence of the trap by thermal fluctuations or the guided flow of the medium.

In the case of strongly underdamped or overdamped systems, such as large particles in dilute gases or in vacuo or small particles in highly viscous media, it is necessary to wait until the particle trapped is in a stable position in the trap. This process usually takes only a few hundredths of a second.

In the case of greatly varying particle sizes, it can be further advantageous to adapt the geometry of the trap, when it operates using divergent electromagnetic beams, to the size of the respective trapped particle.

The particle trapped is rotated by rotating at least one asymmetrical beam profile. In this context, this asymmetry can refer to the distribution of intensity, the state of polarization, and/or a modulation of the phase position over the beam cross-section. Hydrodynamic coupling to a rotating waveguide positioned near the particle can likewise be used for rotating the particle.

On completion of the measurement performed on the particle, for which purpose the rotation has been carried out, the particles can be sorted according to the results of the measurement by using a conveying mechanism known per se.

The system and method of the invention have a number of advantages.

The rotation of the microscopic particles is coupled to the potential aligning them. More particularly, this means that a trapped particle can be rotated through defined, arbitrary angles by means of the system of the invention without using feedback mechanisms. This is particularly important when the spatial structure of the particles to be rotated is not fully characterized and also when the rotation is intended to determine the spatial structure of the particles being rotated, such as when the rotation is implemented for purposes of computer assisted tomography.

Such rotation can be carried out very rapidly, depending on the degrees of asymmetry of the electromagnetic beam and particle, the viscosity of the medium surrounding the particle, the intensity of the laser beam, and the relative mean refractive index. On the other hand, this also allows for the method of the invention to be carried out using relatively little power, e.g. laser beams each of from 10 to 100 mW in the case of particularly sensitive particles such as biological cells that are to be rotated for purposes of computer assisted tomography, for which angular velocities of 360°/sec are sufficient. This means that using divergent laser beams results in that the stresses acting on the cells are much lower than those occurring during manipulation by optical tweezers.

In contrast to dielectric field cages and optical spanners, for example, a trapped particle can be held steady in any passable orientation without necessitating a feedback mechanism. The sample particles can pass through all angles between 0° and 360° relative to at least one axis of rotation. This is useful, for example, for the long-term observation of biological, non-adherent cells, in which it is necessary to prevent accidental rotation of the cell, e.g. rotation caused by Brownian motion, in order to keep constant the angle of view toward the cell.

Embodiments of the invention described herein for aligning and rotating microparticles are to be regarded as a functional unit decoupled from any microscope optical elements used for observation. This offers the following advantages:

The invention makes it possible to rotate microscopic particles about an axis normal to the optical axis of a microscope. This can be used, for example, for computer assisted tomography using a light microscope or other microscopical methods for achieving high isotropic resolutions on solitary, suspended, biological cells and relatively small cell structures.

A microscope used for observing the trapped particles can be operated independently of the invention. It is possible, for example, to adjust the focal plane of the microscope relative to the trapped particles, which is of great significance for, inter alia, confocal and deconvolution microscopy.

Microscopes used for purposes of observation require no, or only slight, modification.

The invention can be arbitrarily combined with optical tweezers. Furthermore, it is possible to combine the invention with a laser microbeam which can incise and microinject.

Furthermore, the invention can also be combined with a microfluidic chamber, which allows for regeneration of a cell medium and can thus be used for long-term observation of cells.

In contrast to optical tweezers, the use of objectives of high numerical aperture is optional. This enables objectives to be used at a large operating distance, for example.

Furthermore, the invention places no particular demands of any kind on the medium surrounding the particles. It is thus possible to trap biological cells in any desired cell media, more particularly in all standard media used conventionally in medicine and biology, and to orient the cells via rotation. The only stipulation regarding the media to be used is that the refractive indices thereof be lower than that of the cell to be examined, which is mostly the case.

Additional advantages will become apparent from the design of the system of the invention and the method of the invention.

A particular feature of the invention is that it can be implemented in a very space-saving manner by using laser beam-guiding optical fibers. The latter typically have an outside diameter of 80 μm, optionally 125 μm, and can thus be integrated well in a system which can be readily adapted to sample holders of conventional light microscopes.

Optical fiber-based embodiments that completely dispense with free-space optical elements are feasible. The feed to the electromagnetic radiation trap, in this case a laser trap, can thus be effected extremely flexibly, which makes it possible to move the trap relatively to the laser source and microscope without necessitating recalibration. Diode-pumped optical fiber lasers can be used as laser sources.

The minute size of feasible embodiments of the invention makes it possible to use them for measuring microfluidic systems. One specific application is the measurement of the viscosity of minute amounts of substances such as are used in chemical microreactors, by measuring the maximum angular velocity at which a known test object can be rotated.

The invention likewise offers the possibility of quantifying extremely small torques such as those occurring in the movement of the flagellum of a bacterium, by comparing the maximum angular velocity achievable during active rotation of the particle by means of the device of the invention with the behavior of the particle in the stationary trap.

In principle, an asymmetrical intensity profile can be achieved by phase modulators of any desired type. The device of the invention basically dispenses with the use of optical lenses, but can be realized or combined therewith if desired.

In preferred designs of the device of the invention, the beam-shaping device comprises optical components having a transmission characteristic that is asymmetrical, more particularly rotationally asymmetrical, about an optical axis. The term, "asymmetrical transmission characteristic" should be understood in its broadest sense. For example, it includes situations in which electromagnetic radiation is asymmetrically coupled into an optical fiber. For example, the asymmetrical transmission characteristic can be provided by a transition region in which two optical fibers are adjacent each other with radial misalignment.

In principle, the light can alternatively be coupled eccentrically into a fiber leading into the sample chamber by other means. For example, when focusing an initially parallel beam with a converging lens onto a clean cut end of an optical fiber, a slight radial misalignment of the focal point likewise results in the generation of higher modes.

In one variant of the device of the invention that can be realized in a particularly simple manner, the asymmetrical transmission characteristic is provided by asymmetrical termination of an optical fiber. However, due to its architecture, an optical fiber can allow for an asymmetrical beam profile correlated to the orientation of the fiber. For example, the optical fiber can comprise an elliptical core. The asymmetrical beam profile can alternatively be produced, for example, by controlled crushing of the optical fiber.

The asymmetrical intensity profile can be rotated by rotating the optical fibers.

Alternatively, astigmatic lenses or mirrors, asymmetrical diaphragms and/or variable aperture diaphragms can be used to provide the desired asymmetrical transmission characteristics.

A variable asymmetrical intensity profile of the laser radiation can be achieved in variants in which the beam-shaping device comprises electronically controllable lenses or a spatial light modulator (SLM). Basically any method in which at least one asymmetrical laser mode is superimposed on a symmetrical fundamental laser mode is suitable for generating an asymmetrical beam profile.

In principle, waveguides or alternatively photonic crystals can be used as optical means for guiding the electromagnetic radiation into the measurement volume. In particularly preferred variants of the invention, the optical means for guiding the electromagnetic radiation into the measurement volume comprise optical fibers.

The rotation of the asymmetrical intensity profile according to the invention can be basically effected in any desired manner. In readily realizable exemplary embodiments, the beam shaping device is mechanically rotated relatively to the measurement volume by means of the rotating device. For example, an asymmetrical end of an optical fiber extending into the measurement volume can be rotated by means of a rotating device of simple construction.

This results in an advantageous development of the method of the invention, in which rotation of the sample particles is at least assisted by hydrodynamic coupling to an optical element, more particularly to the end of an optical fiber, rotating in the region of the measurement volume.

Accordingly, to effect rotation of the intensity profile, an asymmetrically emitting radiation source can be mechanically rotated relatively to the optical means for guiding the radiation into the measurement volume. This variant can be selected when the optical means for guiding the radiation into the measurement volume themselves assert a negligible influence on the intensity profile. The resulting advantage is that access to the measurement volume is virtually unnecessary and, in particular, no rotating parts are present therein.

As an alternative to mechanical rotation of an anisotropically emitting radiation source, an asymmetrically emitting light source can be subjected to specifically modulated control to effect rotation of the asymmetrical intensity profile. Virtually no moving parts are required in this case so that such an arrangement is of advantage particularly from a mechanical point of view. An additional group of variants of the device of the invention and the method of the invention is likewise characterized in that the anisotropic intensity profile is not rotated mechanically. For example, rotation of the asymmetrical intensity profile can be effected by rotating the plane of polarization. For this purpose, the device can comprise an active polarizing unit, more particularly, a Faraday cell. Together with further components such as birefringent and/or non-linear optical components, rotation of an asymmetrical intensity profile can be achieved by rotating the plane of polarization. For example birefringent optical fibers can be used.

Conversely, if, for example, the entire light source is rotated and it already emits polarized light, the plane of polarization rotates concurrently with rotation of the intensity profile.

Optical fibers having a rotationally asymmetrical profile may be used for this purpose.

In particularly advantageous variants, the electromagnetic radiation enters into the measurement volume from one end of an optical fiber, which end can either be planar or in the form of a diaphragm or it can have defined asymmetry.

The electromagnetic radiation can basically originate from any desired source, lasers being used to advantage for this purpose.

In principle, the lasers can be pulsed lasers, which may be advantageous if, for example, non-linear optical components are used. In simple variants continuously radiating radiation sources are used.

The sample particles to be manipulated must in some way be first transported into the sphere of influence of the electromagnetic radiation in the measurement volume.

This transportation can be carried out, for example, by means of the optical tweezers described above and additionally or alternatively with the aid of dielectrophoretic forces.

If space permits, the sample particles are fed by a capillary tube to a suitable position in the measurement volume. In doing so, the sample does not need to leave the capillary tube. For example, a microfluidic transport system can be used that comprises a glass capillary tube having a square cross-section and through the walls of which the electromagnetic radiation impinges on the sample particles. In general, the particles can be moved to the sphere of influence of the radiation by means of a microfluidic system.

The device of the invention and the method of the invention can be used, to particular advantage, for investigation of biological samples such as cells, cell organelles, and/or minute pieces of tissue as sample particles. In this case, the sample particles are preferably suspended in aqueous media.

One essential advantage of the invention as compared with manipulation methods known from the prior art is the very high degree of freedom to rotate the sample particles continuously at high angular velocity or very slowly or in defined steps, or, more particularly, in jerks.

One particularly advantageous application results from combining the invention with microscopy, in which the resolution in the lateral direction differs from that in the axial direction. With the aid of the device of the invention and the method of the invention, sample particles can be rotated in a specific fashion for microscopical observation in order to achieve a definite, more particularly isotropic, resolution. This is possible because the beam axis of the device of the invention can be selected completely independently of the optical axis of a light microscope. The sample can be rotated and imaged in steps, for example for purposes of computer assisted tomography. The isotropic resolution results from processing several images of the sample at varying angles using a computer.

Furthermore, there are additional advantageous applications in the field of microscopy.

For example, sample particles can be positioned and aligned for examination under the microscope using different contrast enhancing methods, particularly methods involving phase contrast, fluorescence microscopy, ultrasonic microscopy, confocal microscopy, CARS, and/or for manipulations involving the use of light microscopy such as FRAP, and uncaging. A combination of the method of the invention with methods for cell micro-injection and the long-term observation of cell balls and cells is also possible.

There are also particularly advantageous applications in the field of laser scanning microscopy and tomographic methods.

In additional applications of the method of the invention, which are basically independent of any microscopical observation of the measurement volume, use is made of the possibility of basically rotating the sample particles at any desired velocity in the surrounding medium. In principle, the particles may also be rotated as slowly as desired, in the limiting case of low angular velocities in stable equilibrium as regards position and/or orientation.

By means of suitably executed calibrations, the method of the invention can be employed to measure forces and torques acting on the particles positioned in the anisotropic radiation field. Elasticity tests are similarly possible.

If the sample particles have a refractive index deviating from their surroundings, the passage of the photons therethrough results in a momentum transfer and consequently in a force acting on the sample particles. This force can be compensated, for example, by the force of gravity, if the radiation source is positioned suitably.

In particularly preferred variants, at least one additional radiation source is present for compensating forces exerted on the sample particles as a result of the momentum transferred by photons in the electromagnetic radiation. Such additional radiation sources may be used for performing elasticity tests on the aligned sample particles.

The rotation of one or more sample particles may alternatively be utilized for setting a surrounding sample medium in rotary motion.

The method of the invention may be implemented for processing and controlled external manipulation of a sample particle for example, for aligning it for exposure to a microtool such as an optical scalpel, a micropipette or a patch clamp.

Finally, the viscosity of the surrounding medium, such as the aqueous medium in which the particle moves, may be determined from the maximum possible angular velocity of a sample particle. The measured maximum angular velocity in a medium of known viscosity, for example water, may provide information concerning the sample particle or, more particularly, the shape thereof. For example, it is possible to discern whether a cell nucleus is in the process of dividing.

In a particularly preferred exemplary embodiment of the invention, an additional radiation source is present that emits electromagnetic radiation in a direction contrary to the direction of radiation of the first radiation source. Such devices are also referred to as two-beam traps.

So-called four-beam traps can be advantageous if a particle to be examined is to be rotated about an additional axis or if a cell is to be suitably aligned for micropipetting. In this case, a first pair of radiation sources and a second pair of radiation sources are present, each of which forms a two-beam trap and is directed toward the same sample volume. The beam axes of the two-beam traps cross each other, more particularly, they are at right angles to each other. In principle, the two beam axes can together enclose a comparatively small angle, for example, about 10°.

In a particularly preferred variant of the method of the invention, sample particles are aligned with their principle axis of anisotropy along the direction of an optical axis of the electromagnetic radiation. This results in distinct advantages for, say, a tomographic examination of the sample.

The sample particle can be manipulated in the direction of the optical axis, if standing waves are generated in the measurement volume, by superimposing, in a two-beam trap, the electromagnetic radiation from a first radiation source with coherent electromagnetic radiation on a second radiation source radiating in the opposite direction.

The sample particles can then be moved in the measurement volume in the direction of the optical axis if the relative phase position of the superposed waves, that is to say, the phase position of the standing waves, is changed in a controlled manner.

As regards the use of the device of the invention together with a confocal microscope, it is preferable to carry out tomographic microscopic imaging of a sample particle. For this purpose, a sample particle aligned along its principal axis of anisotropy is rotated about the optical axis by means of the device of the invention. This method is also referred to as axial tomography.

The asymmetrical transmission characteristic can preferably be provided by an asymmetrical termination of an optical fiber.

The beam shaping device can preferably have at least one optical fiber having a rotationally asymmetrical profile.

The asymmetrical transmission characteristic can preferably be provided by astigmatic lenses or mirrors, by an asymmetrical diaphragm and/or by variable aperture diaphragms.

The beam shaping device can preferably be rotated relatively to said measuring volume by means of said rotating device.

The rotating device can preferably include an active polarizing device, more particularly a Faraday cell.

The electromagnetic radiation can preferably enter said measurement volume from an end of an optical fiber.

A particularly preferred embodiment of the inventive device is characterized in that a first pair of radiation sources and a second pair of radiation sources are present, each of which forms a two beam trap, that each of said two beam traps is directed toward the same measurement volume, and that said two beam traps cross each other.

The electromagnetic radiation used can preferably be laser light. The radiation source can preferably radiate continuously.

For the purpose of rotating the intensity profile, an asymmetrically emitting radiation source can preferably be rotated relatively to said optical means for guiding the radiation into said measurement volume.

Rotation of said asymmetrical intensity profile can preferably be effected by rotating the plane of polarization.

For the purpose of rotating an asymmetrical intensity profile, an asymmetrically emitting light source can preferably be subjected to specifically modulated control.

The sample particles can preferably be transported by means of optical tweezers into the zone of action of said electromagnetic radiation in said measurement volume.

The sample particles can preferably be transported by means of dielectrophoretic forces into the zone of action of said electromagnetic radiation in the measurement volume.

The sample particles can preferably be introduced into said measurement volume by means of a capillary tube.

The sample particles can preferably be rotated continuously or in defined steps, more particularly in jerks.

The sample particles in the form of biological samples, particularly cells, cell organelles, or minute pieces of tissue can preferably be trapped and rotated or aligned for analysis purposes.

The sample particles can preferably be suspended in aqueous media.

Sample particles for microscopical testing can preferably be rotated in a specific manner to achieve a definite, more particularly isotropic, resolution.

A sample particle can preferably be specifically manipulated and aligned for processing and/or for specific external manipulation, more particularly for exposure to a microtool, such as an optical scalpel, a micropipette, or a patch clamp.

The sample particles can preferably be specifically positioned and aligned for microscopical testing by implementing various contrast enhancing methods, in particular methods involving phase contrast, fluorescence microscopy, ultrasonic microscopy, confocal microscopy, CARS and/or for optomicroscopic manipulations, more particularly FRAP or uncaging.

Measurements of elasticity can preferably be carried out on aligned sample particles.

The viscosity of the medium surrounding a particle can preferably be determined from the maximum possible angular velocity of said particle.

A tomographic microscopic image of a sample particle can preferably be created.

BRIEF DESCRIPTION OF THE DRAWINGS

Additional advantages and features of the invention are described below with reference to the accompanying drawings, in which.

DETAILED DESCRIPTION OF THE INVENTION

Exemplary Embodiment 1

In the following a two-beam laser trap based on optical fibers, which is modified according to the invention, is described as an exemplary embodiment.

Figure 1:
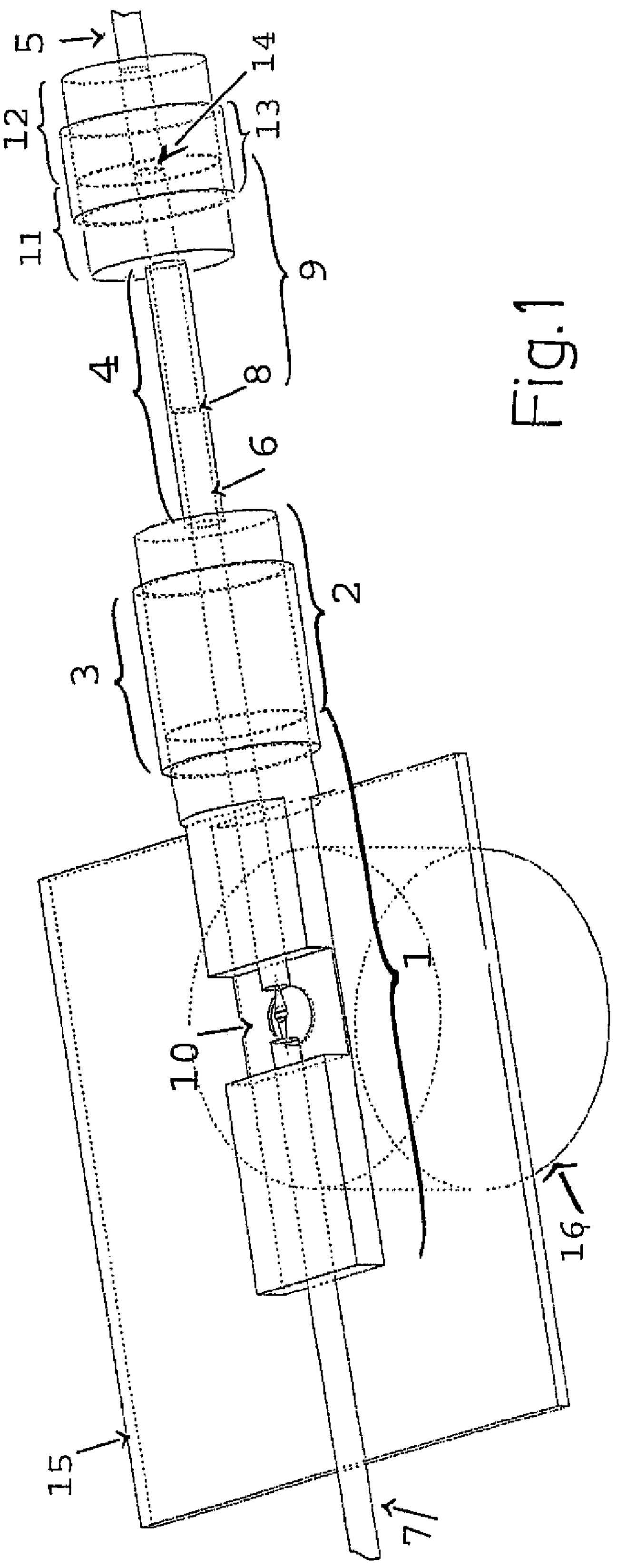
FIG. 1 is an exemplary embodiment of a device of the invention.

Schematically shown in FIG. 1 is the set-up which consists of a ceramic body 1, which allows for the alignment of laser beam carrying optical fibers 6 and 7 through an accurately fitting channel through drill holes, two friction bearings, consisting of the ceramic shells 3 and 13 and the guided ceramic cylinders 2 and 11, which allow for a rotation of the optical fiber 6, which is guided into the sample chamber 10 from the right, without twisting. The complete set-up is mounted on a commercially available light microscope with an indicated objective 16, so that samples in the laser trap 10 can be observed through the microscope slide 15.

The left optical fiber 7 is a so-called single mode fiber, i.e. an optical fiber which radiates the laser light carried by it with a Gaussian rotationally symmetrical intensity profile, whilst the laser beam emitted by the right optical fiber 6 does not have this symmetry. This is due to the slightly misaligned transition 8 from a single mode fiber 5 to an optical fiber 6 which is excited to higher vibrational modes at the wavelength of the laser used, as its fiber core is larger compared to the single mode fiber 5, and is therefore also called multimode fiber. The extension of the single mode fiber 5, which is coupled to the optical fiber 6 in the area of the transition 8, is denoted with the reference sign 9. This optical fiber 9 is an elongation of the optical fiber 5, but is mechanically decoupled from the optical fiber 5 at the transition point 14. The optical fiber 9 and the optical fiber 5 are similar single mode fibers. The laser profile which is thus created within the part of the optical fiber 6, which is guided into the sample chamber 10 from the right, is, however, still dominated by the fundamental laser mode, i.e. the Gaussian laser mode, but it has no rotational symmetry due to the superposition of higher modes witch in general show only a discrete symmetry. Thus, the beam-shaping device is provided by the transition 8 of the fiber 5 to the fiber 6. The rotation of this intensity profile is effected by the rotation of the last centimetres of the right hand optical fiber 6 in front of the sample chamber 10 without twisting. This rotation begins at the transition point 14 with the ceramic cylinders 2 and 11, in whose centric drill holes the optical fiber 6 is glued, as well as at the protection coating 4 of the transition 8 between optical fibers, the protection coating simultaneously serving as a mechanically rigid coupling of the ceramic cylinder 2 to the ceramic cylinder 11. Two planarly cut polished ends of optical fibers touch each other in the region of the transition point 14, said optical fiber ends being aligned by a friction bearing which substantially consists of two ceramic cylinders 11 and 12 as well as a ceramic shell 13, thus enabling the rotation of the two fibers relative to each other on the one hand, and on the other hand coupling the laser light emitted by the optical fiber 5 into the optical fiber 9 virtually without any losses. The rotation of the part of the optical fiber 6, which forms the source of asymmetry of the laser profile and is led into the sample chamber from the right, can be effected manually or by using a motorized propulsion. The components 2, 4, 6, 8, 9 and 11 form a rigid unit which is rotatable relative to the rest of the system.

The optical fibers used are commercially available step-index fibers, i.e. optical fibers which have a refractive index that varies in jerks in the region of transition from the fiber core to the fiber cladding which surrounds the core. The numerical aperture of the fibers (NA) is circa 0.14. Additionally, the multi mode optical fiber conserves the polarisation by additional structural elements in the area of the fiber core and thus enables an especially stable transport of the laser profile, which gains its shape in the area of a misaligned splice or transition 8. The multi mode fiber as well as the single mode fiber have an outer diameter of 125 μm after removal of the acrylic protection coating initially surrounding the fibers, and thus can be optimally aligned and guided through the drill holes of the used ceramics, which drill holes have a diameter of 126 μm. Furthermore, the diameter of the core of the multi mode fiber 6 is chosen in such a way, that the propagation of only few vibrational modes is possible in the fiber. The V number, which is characteristic regarding the wave propagation in an optical fiber, has a value between 2.405 at the transition to the single mode region and approximately 4, at the used wavelength of 1060 nm for the multi mode fiber. The optical fibers are fed by fiber laser modules which are supplied with an output power between a few milliwatt and several watt depending on the sample to be manipulated. Here, the damping of the laser beam intensity in the optical fiber can be neglected due to the short length of the fiber. However, losses in the area of the transition 8 of optical fibers may be circa 5-10%.

The functionality of this set-up is as follows: The gradient and scattering forces typical for optical two-beam traps act on particles and center them in the trap if the particles reach the area of the laser beams emitted by the optical fibers. The rotation of the asymmetrical laser profile emitted by the piece of the optical fiber 6 coupled to the rotation of the fiber itself produces the rotation of the particle in the trap parallel to the optical axis of the optical fibers. By this the rotation of the particle is directly correlated with the rotation of the optical fiber and is only slightly retarded in the case of a medium of high viscosity.

Exemplary Embodiment 2

Figure 2:
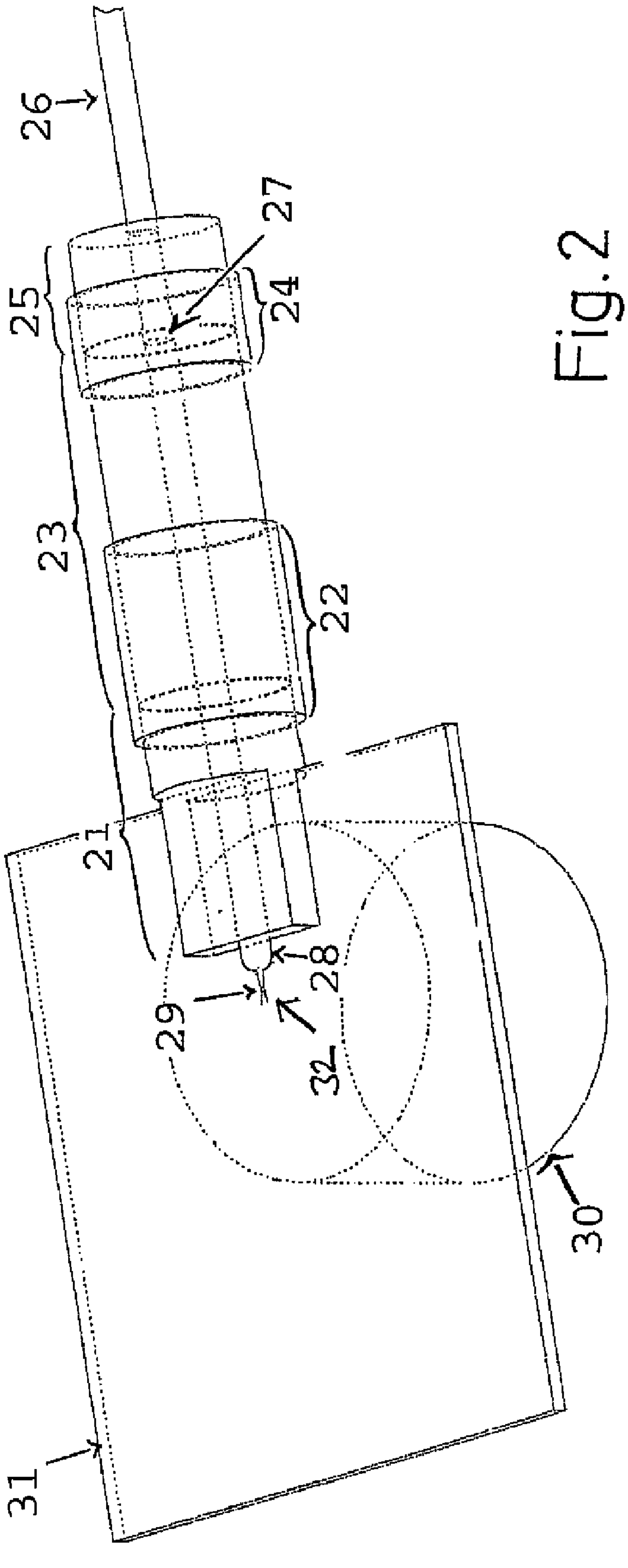
FIG. 2 is an exemplary embodiment of a device operating with focused radiation.

In the following, a single-beam trap based on optical fibers, which is schematically shown in FIG. 2, is described. The set-up of this system is comparable to that of the exemplary embodiment 1. The substantial differences reside in the use of only a single laser beam as well as in the creation of its profile.

The set-up consists of a part of a single mode optical fiber 28 which is aligned by a ceramic guidance 21, wherein the rotation without twisting of the part of optical fiber 28 is effected by two friction bearings consisting of the ceramic shells 22 and 24, which are glued to the ceramic guidance 21 and the ceramic cylinder 25 respectively, as well as the ceramic cylinder 23, which forms together with the part of optical fiber 28 a rigid and in relation to the rest of the set-up rotatable unit. The mechanical decoupling of the part of optical fiber 28 from the single mode optical fiber 26 is allowed by the transition region 27, in which the planarly polished ends of optical fibers 26 and 28 contact each other.

In contrast to exemplary embodiment 1 the laser beam used is not divergently emitted by the optical fiber 28, but is emitted in a focusing way by the miniature lens 32 (rounding of the optical fiber end) and has furthermore a slight astigmatism. In this case the word miniature lens 32 means a rounding of an optical fiber end 28, which starts in the transition region 27 and leads to the sample chamber.

The preparation of the optical fiber end is effected as follows: Firstly, the core of the optical fiber 28 is exposed in the area of its end with hydrofluoric acid, which decomposes the surrounding glass. The thus created narrowed end-piece of the optical fiber 28 is now put into an electric light generated between two needle tips for about 0.2 seconds inside a so-called arc fusion splicer (a device usually used for connecting optical fibers). In doing so the end of the fiber is rounded due to the surface tension of the glass and thus forms the miniature lens 32 after cooling. Due to the preferential direction of the electric arc this lens 32 shows a slight astigmatism, which leads to the laser beam radiated by the optical fiber 28 having an elliptical profile.

In the focus 29 of the optical fiber 28 modified in this way, it is possible to trap and orientate microscopic particles. A rotation of trapped particles is again effected by rotating the laser profile coupled to the optical fiber 28.

Preferentially the set-up is fixed to a microscope slide 31 via the ceramic guidance 21 in such a way that particles trapped in the focus of the laser beam 29 can be observed with a light microscope, the objective 30 of the microscope being indicated in the figure.

Other embodiments are possible, e.g. those in which laser beams are created by laser diodes in the direct vicinity of the sample chamber and are prepared by suitable optics.

Example 1 of the Method

Method for Long-Term Examination of Zebrafish Embryos

For the developmental biology and genetics zebrafish embryos are an interesting field of research as they are easy to handle and their development can be light-microscopically followed until a high stage due to their transparency.

But as the extension of these embryos exceed the depth of sharpness of conventional microscopes, other methods are required for creating imagines of the samples with a spatially high resolution. Here, the confocal microscopy is wide spread which scans the sample in layers via a laser beam in order to subsequently merge the layers to form a three-dimensional model. Also wide spread is the use of deconvolution techniques in which a three-dimensional image is calculated out of a stack of single light-microscopic images of parallel planes of focus. A disadvantage of these methods resides in the fact that it may last several minutes until a stack of images is recorded and can be displayed on a computer. Thus, an on-line screening of the development of an embryo is not possible.

The example of the method describes in the following, how the system according to exemplary embodiment 1 can be used for examining the three-dimensional development of a zebrafish embryo with a conventional light microscope:

The method comprises the steps:

Preparation of the two-beam trap: Fixing of the ceramic which guides the optical fibers to the microscope slide of a microscope, adaptation of the distance of the optical fiber ends to about 2 mm, feeding the optical fibers with fiber lasers (out-put power about 2 W per fiber, wavelength 1064 mm), Removal of one or several embryos out of the culture, If necessary further pre-treatment, e.g. exposition to cytotoxins, drugs or other influences serving the object of the examination, Broad moistening of the optical fiber ends with a medium according to the requirements of the experiment, Adding one or several embryos with a wide pipette, Trapping an embryo in the trap: In the least cases an embryo is immediately in the trap. In the majority of cases it is necessary to flush it into the trap with the flow created by micro-pipettes. Alternatively, this flow can be caused by an object, which is moved through the medium but does not touch the embryo.

If the embryo is trapped, it can be rotated continuously or in steps around the optical axis of the trap by rotating the asymmetrical profile of one of the laser beams used. By imaging arbitrary slices parallel to the axis of rotation of the sample, this makes possible to measure the development of the embryo in three dimensions. The rotation of the beam profile is carried out manually or motorized with a resolution smaller than one degree. The use of fluorescence techniques or other microscopy techniques is optional and possible.

In long-lasting examinations (longer than 30 minutes) it may be useful to exchange a used medium continuously by application of a micro-fluid system which is driven by a surgery pump or by adding distilled water to counteract an increase of the substances solved in the medium caused by evaporation.

Example 2 of the Method

Rotation of suspended, solitary, biological cells for the purpose of computer tomography by using a micro-fluid system integrated in the exemplary embodiment 1 together with a phase contrast microscope.

The method comprises the following steps:

The micro-fluid system is integrated into the system described in the exemplary embodiment 1. The micro-fluid system substantially consists of a glass capillary with a square cross section through which the cells are transported into the sphere of influence of the optical trap. The regulation of the flow through this capillary is effected by an electric surgery pump.

The preparation of the optical two-beam trap is oriented to the following parameters:

Distance of the fiber ends about 250 μm,

Laser power about 100 mW per optical fiber (not pulsed),

Wavelength of the lasers used in the near infrared (e.g. 1064 nm).

The desired cells are taken from the culture or an organism and are suitably prepared. Adherent cells are solved from their substrate and, if needed, are suspended in a cell medium by adding enzymes (e.g. trypsin) and chemicals.

Possible impurities as well as other cell types are removed from the sample by methods such as the density gradient centrifugation or flow cytometry.

The cells are diluted or are accumulated by e.g. centrifugation in their medium to a concentration of 10,000 cells/ml.

The cells in their medium are injected into the micro-fluid transportation system by a syringe.

The cells are transported through the micro-fluid system into the sphere of influence of the laser trap by using a syringe pump.

If a cell is present in the trap, the flow is stopped.

The cell is now rotated as a consequence of the rotation of the asymmetrical profile of one of the laser beams used in steps of 5° through 360° and is photographed in each orientation by a camera connected to the phase contrast microscope used for the observation.

The pictures are read and digitized by a computer immediately or after completion of the series of photographing.

Based on software, a three-dimensional model of the cell is calculated from the single pictures.

Figure 3:
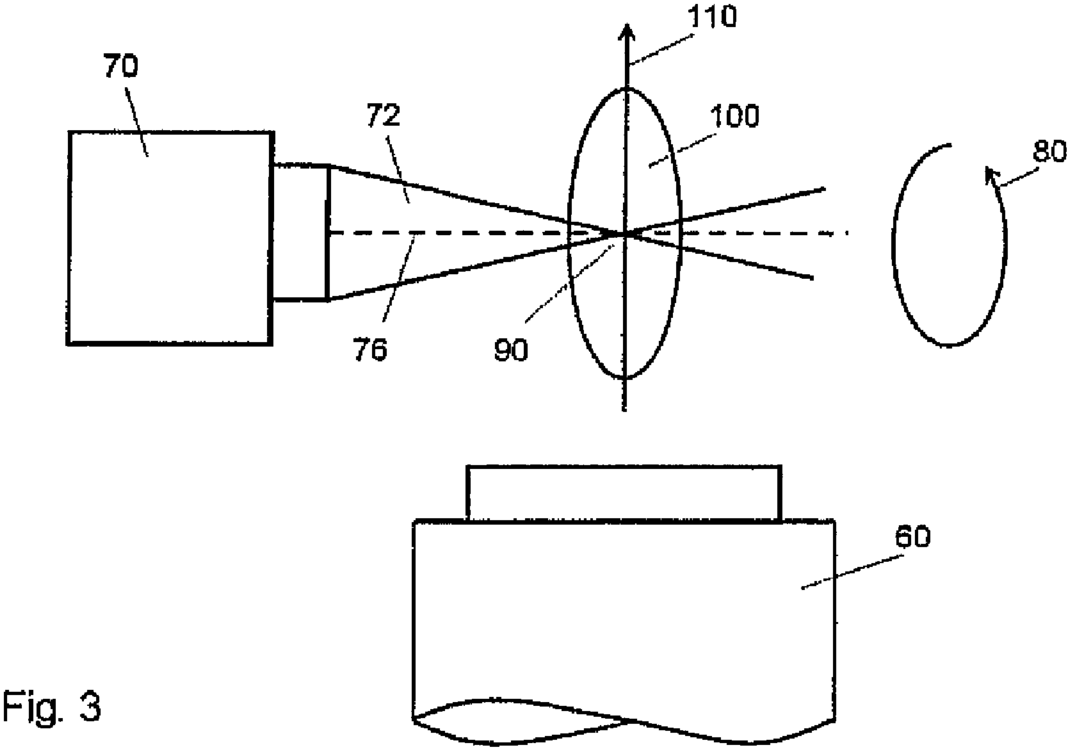
FIG. 3 is a diagrammatic representation of rotation geometry known from the prior art.

FIG. 3 shows schematically a system according to U.S. Pat. No. 5,363,190. In this, an optical element 70 transmits focussed laser radiation 72 into an area of a measurement volume 90 in which a sample particle 100 is trapped. The radiation 72 has an elliptical intensity profile which is not shown in detail and the sample particle orients itself with its principle axis of anisotropy 110 in such a way that the principle axis of anisotropy 110 is oriented parallel to the larger principal axis of the elliptical intensity profile. Then, the sample particle 100 can be rotated about the optical axis 76 by rotating the elliptical intensity profile. In FIG. 3 this is indicated by the arrow 80. In general, the sample particle 100 can be observed with a microscope 60 transversely to the direction of the optical axis 76, wherein in this system it is disadvantageous that the position of rotation of the sample particle 100 about the principle axis of anisotropy 110 is not defined.

Figure 4:
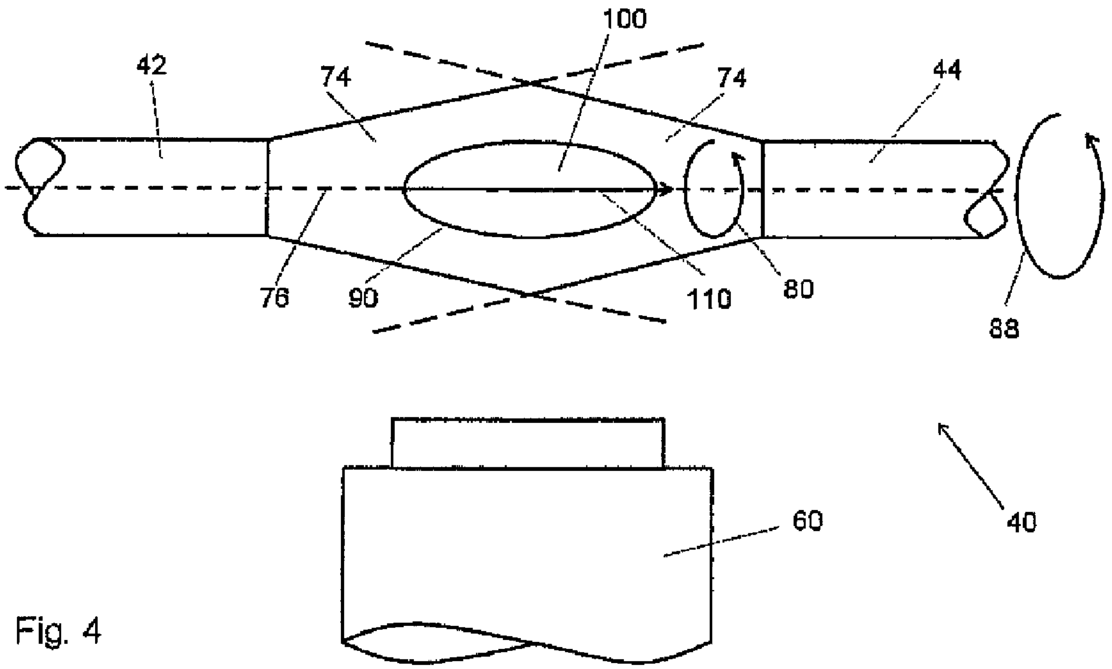
FIG. 4 is a diagrammatic representation of the rotation geometry used in the invention.
Figure 5:
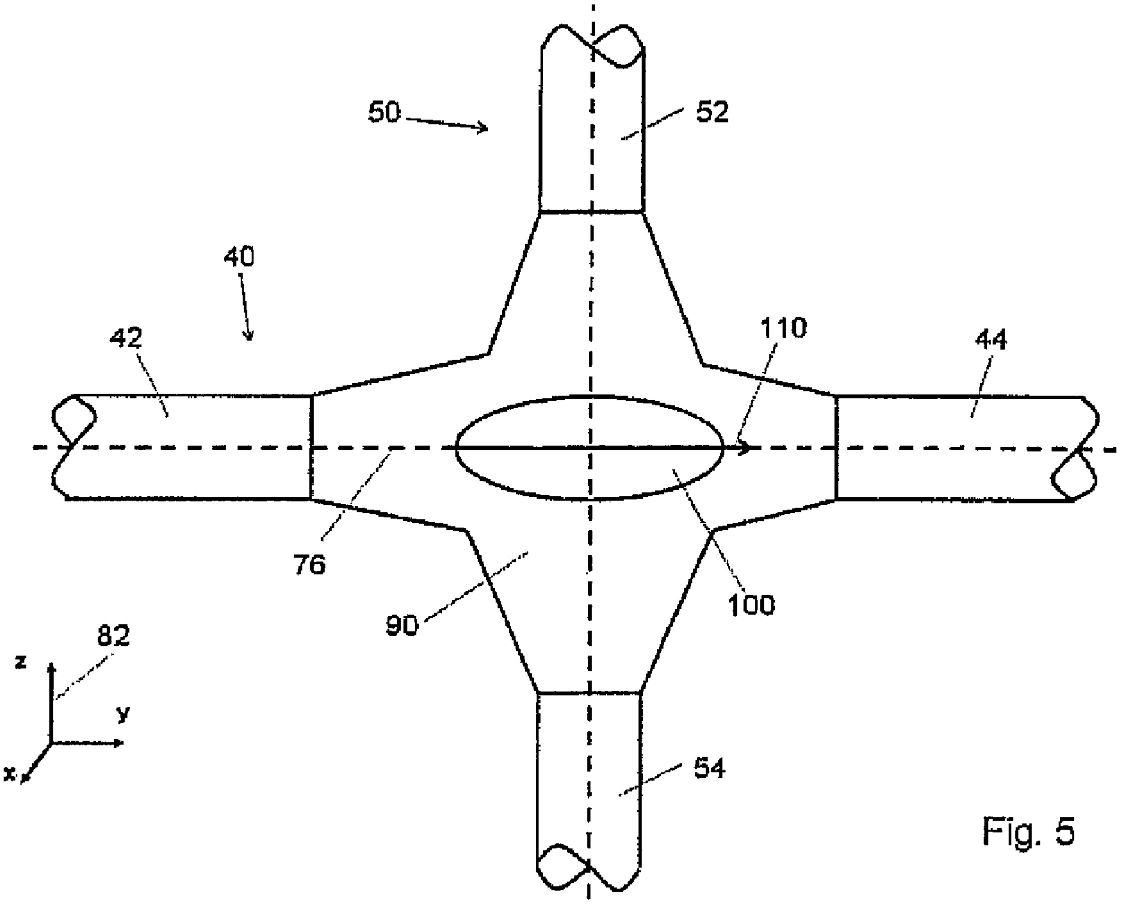
FIG. 5 is a diagrammatic representation of a four-beam trap.

In FIGS. 3 to 5 equivalent components are denoted with the same reference signs.

In the set-up according to the invention shown in FIG. 4 a two-beam trap 40 is formed by two opposite optical fiber ends 42, 44 each emitting a divergent bundle of beams 74 and thus constituting radiation sources.

Different to the situation shown in FIG. 3, in FIG. 4 the sample particle 100 orients itself with its principle axis of anisotropy 110 parallel to the optical axis 76. Then, only the second axis of anisotropy of the sample particle 100 couples to the asymmetrical beam profile. The reason for this is principally that the radiation is not focussed so that a certain intensity of radiation is present over a substantially larger area. Therefore, the orientation in the shown manner results substantially from a minimization of the energy of the sample particle 100 in the electromagnetic radiation field.

The optical fiber 44 can be rotated in a direction indicated by the arrow 88 about the optical axis 76. Due to the coupling of the sample particle 100 to the asymmetrical beam profile the sample particle 100 follows the rotation of the optical fiber 44, probably retardedly due to its inertia and the alignment in a fluid medium. This is indicated by arrow 80. Thus, the sample particle 100 is unambiguously positioned along two axes being independent from each other, so that it can be tomographically examined with the microscope 60.

FIG. 5 shows in a schematic diagram a four-beam trap which is constituted of two two-beam traps 40, 50 which are oriented to each other transversely, in particular perpendicularly. The first two-beam trap 40 is formed by the optical fibers 42, 44. The optical fibers 52, 54 form the second two-beam trap 50. A coordination system is denoted with the reference sign 82.

The sample particle 100 hold in the measurement volume 90 can be rotated about its principal axis of anisotropy 110, which is substantially about the y-axis, with the first two-beam trap 40. Then, via the second two-beam trap 50 the sample particle 100 can be rotated about an independent direction, in the example shown about the z-direction. The four-beam trap shown in FIG. 5 can be used for e.g. appropriate alignment of a cell or a cluster of cells for micropipetting. Furthermore, there exist a large amount of advantageous applications in microscopy.

The two-beam traps shown in FIGS. 4 and 5 correspond substantially to the set-up of FIG. 1.

LIST OF REFERENCE SIGNS

1 ceramic guidance for optical fibers with cylindrical extension
2 ceramic cylinder
3 ceramic shell glued to (1) as a guidance for (2)
4 protection for the transition piece (8), as well as mechanically rigid coupling of (2) to (11)
5 single mode optical fiber fed by fiber laser module
6 multi mode optical fiber
7 single mode optical fiber fed by fiber laser module
8 transition of optical fiber (5) to optical fiber (6) misaligned by approximately 2 μm
9 single mode optical fiber
10 actual laser trap, sample chamber
11 ceramic cylinder glued to (9) and (4)
12 ceramic cylinder
13 ceramic shell or ceramic guidance glued to (12)
14 rotatable transition of (9) to (5)
15 microscope slide (slim glass plate)
16 objective (as part of a microscope, optional)

explanation: The components 2, 4, 6, 8, 9 and 11 form a rigid unit which is rotatable in relation to the rest of the system
21 ceramic guidance for optical fibers with cylindrical extension
22 ceramic shell glued to (21) as a guidance for (23)
23 ceramic cylinder, rotatable, in which an optical fiber (28) is glued; mechanically rigid coupling of (22) to (31)
24 ceramic shell glued to (25) as a guidance for (23)
25 ceramic cylinder, in which an optical fiber (26) is glued
26 single mode optical fiber fed by fiber laser module
27 rotatable transition of (26) to (28)
28 single mode optical fiber with an asymmetrical rounded end, glued into (23)
29 focussed laser beam that leaves the optical fiber with a slight astigmatism (actual laser trap, sample chamber)
30 objective of a light microscope (optional)
31 microscope slide (slim glass plate)
explanation: the components (23) and (28) form a rigid unit which is rotatable in relation to the rest of the system
32 miniature lens at the end of optical fiber (28)
40 first two-beam trap
42 optical fiber
44 optical fiber
50 second optical beam trap
52 optical fiber
54 optical fiber
60 microscope
70 optical element
72 focussed radiation
74 divergent radiation
76 optical axis
80 arrow
82 coordination system
88 arrow
90 measurement volume
100 sample particle
110 principle axis of anisotropy

The invention claimed is:

1. A device for contactless manipulation and alignment of sample particles in a measurement volume using a nonhomogeneous electric alternating field, comprising a radiation source for emitting electromagnetic radiation and optical means for guiding said electromagnetic radiation into said measurement volume,
wherein
said optical means include a beam shaping device for generating an intensity profile that is asymmetrical about the beam axis, wherein sample particles in the measurement volume can be trapped in a nonhomogeneous field distribution of the electric field generated by said asymmetrical intensity profile,
for the purpose of entraining sample particles trapped in said nonhomogeneous field distribution there is provided a rotating device to effect rotation of said asymmetrical intensity profile about said beam axis relatively to said measurement volume, and
the electromagnetic radiation beam in the measurement volume is unfocused.

2. The device as defined in claim 1,
wherein
the electromagnetic radiation beam in the measurement volume is divergent.

3. The device as defined in claim 1,
wherein
said beam shaping device includes optical components having a transmission characteristic that is asymmetrical about an optical axis.

4. The device as defined in claim 1,
wherein
said beam shaping device includes optical components having a transmission characteristic that is rotationally asymmetrical about an optical axis.

5. The device as defined in claim 1,
wherein
said optical means for guiding said electromagnetic radiation into said measurement volume comprise optical fibers.

6. The device as defined in claim 4,
wherein
said asymmetrical transmission characteristic is provided by a transition region, in which two optical fibers are adjacent each other with radial misalignment.

7. The device as defined in claim 1,
wherein
said beam shaping device has at least one of electronically controllable lenses and a spatial light modulator.

8. The device as defined in claim 1,
wherein
at least one further radiation source is present for the purpose of compensating forces acting on the sample particles due to momentum transfer of photons in said electromagnetic radiation.

9. The device as defined in claim 1,
wherein
just one further radiation source is present that emits electromagnetic radiation in a direction which is contrary to a direction of radiation of the first radiation source.

10. A device for contactless manipulation and alignment of sample particles in a measurement volume using a nonhomogeneous electric alternating field, comprising a radiation source for emitting electromagnetic radiation and optical means for guiding said electromagnetic radiation into said measurement volume,
wherein
said optical means include a beam shaping device for generating an intensity profile that is asymmetrical about the beam axis, wherein sample particles in the measurement volume can be trapped in a nonhomogeneous field distribution of the electric field generated by said asymmetrical intensity profile,
for the purpose of entraining sample particles trapped in said nonhomogeneous field distribution there is provided a rotating device to effect rotation of said asymmetrical intensity profile about said beam axis relatively to said measurement volume, and
the electromagnetic radiation beam in the measurement volume is divergent.

11. A method for contactless manipulation and alignment of sample particles in a measurement volume using a nonhomogeneous electric field,
in which electromagnetic radiation is guided into a measurement volume and
in which sample particles in the measurement volume align in a nonhomogeneous electric field of said introduced electromagnetic radiation, wherein
an intensity profile asymmetrical about the beam axis is imposed on the electromagnetic radiation that is introduced into said measurement volume, which intensity profile produces, in said measurement volume, a nonhomogeneous field distribution of the electric field, in which sample particles are trapped,
for entrainment of said sample particles trapped in said nonhomogeneous field distribution said asymmetrical intensity profile is rotated about the beam axis relatively to said measurement volume, and the electromagnetic radiation in said measurement volume is unfocused.

12. The method as defined in claim 11, wherein the electromagnetic radiation in said measurement volume is divergent.

13. The method as defined in claim 11, wherein one or more particles are rotated in order to set the circumambient sample medium in rotary motion.

14. The method as defined in claim 11, wherein the forces and torques acting on sample particles positioned in said anisotropic radiation field are measured.

15. The method as defined in claim 11, wherein the rotation of the sample particles is at least assisted by hydrodynamic coupling with an optical element rotating in the region of said measurement volume.

16. The method as defined in claim 11, wherein the rotation of the sample particles is at least assisted by hydrodynamic coupling with an optical element rotating in the region of said measurement volume, the optical element being the end of an optical fiber.

17. The method as defined in claim 11, wherein a sample particle is aligned with its principle anisotropy axis in the direction of an optical axis of said electromagnetic radiation.

18. The method as defined in claim 11, wherein in said measurement volume standing waves are produced by superimposing the electromagnetic radiation from a first radiation source with electromagnetic radiation, which is coherent thereto, of a second radiation source radiating in the opposite direction.

19. The method as defined in claim 18, wherein the sample particles in said measurement volume are moved in the direction of the optical axis by varying the phase position of the standing waves.

20. A method for contactless manipulation and alignment of sample particles in a measurement volume using a nonhomogeneous electric field, in which electromagnetic radiation is guided into a measurement volume and in which sample particles in the measurement volume align in a nonhomogeneous electric field of said introduced electromagnetic radiation, wherein an intensity profile asymmetrical about the beam axis is imposed on the electromagnetic radiation that is introduced into said measurement volume, which intensity profile produces, in said measurement volume, a nonhomogeneous field distribution of the electric field, in which sample particles are trapped, that for entrainment of said sample particles trapped in said nonhomogeneous field distribution said asymmetrical intensity profile is rotated about the beam axis relatively to said measurement volume, and that the electromagnetic radiation in said measurement volume is divergent.

21. A laser scanning microscope, which is coupled to a device as defined in claim 1.

22. The laser scanning microscope of claim 21 which is designed as a confocal laser scanning microscope.

23. A method for operating a laser scanning microscope as defined in claim 21, in which sample particles to be examined are subjected to specific contactless manipulation and alignment in a measurement volume by the method as defined in claim 11 and in which the sample particles to be examined undergo examination in said measurement volume by means of said laser scanning microscope.

* * * * *